April 7, 1942.                G. S. HOELL                2,279,197
                            FORMING MACHINE
                         Filed Aug. 22, 1939            2 Sheets-Sheet 2
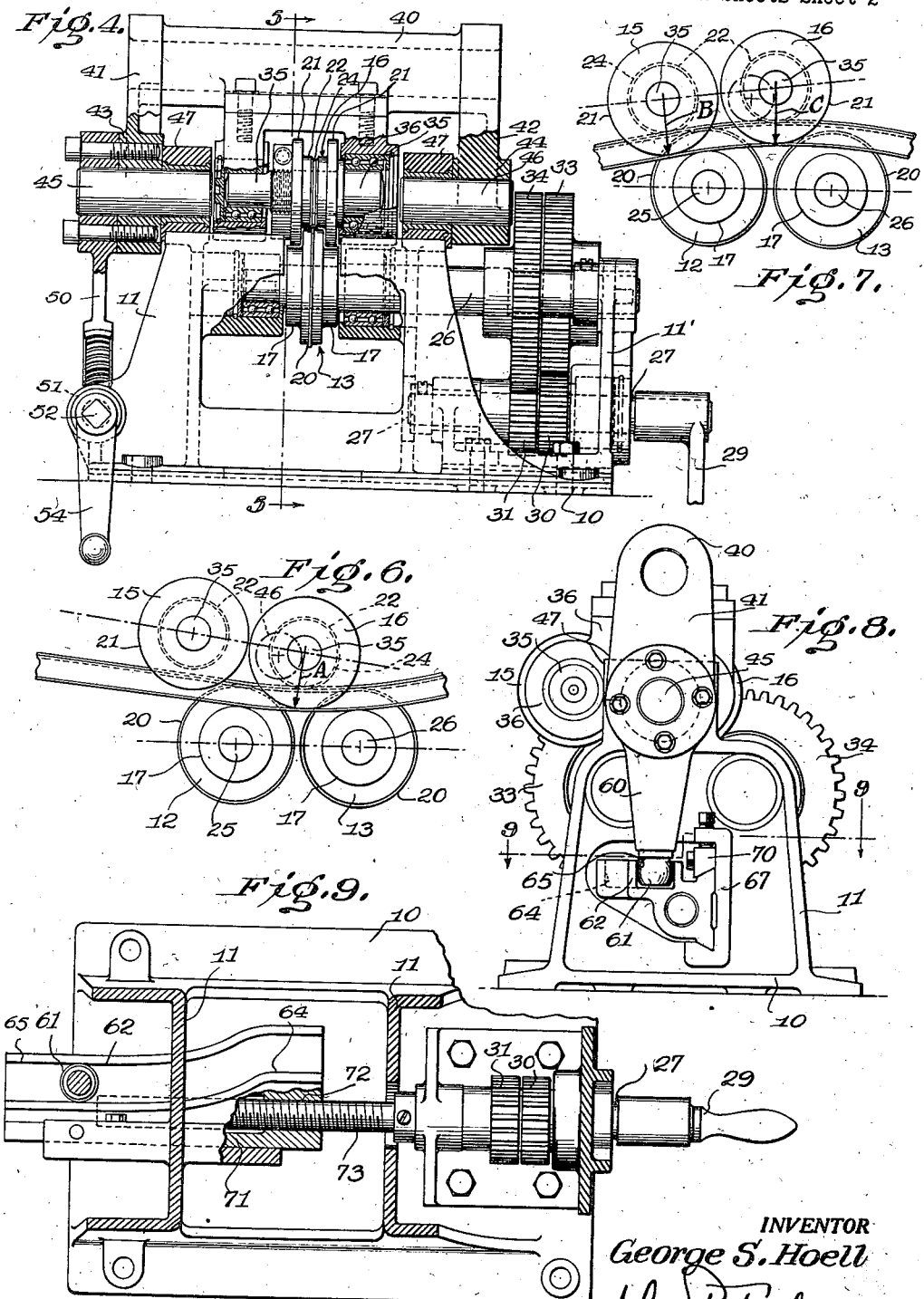
INVENTOR
George S. Hoell
BY John P. Tarbox
ATTORNEY Patented Apr. 7, 1942

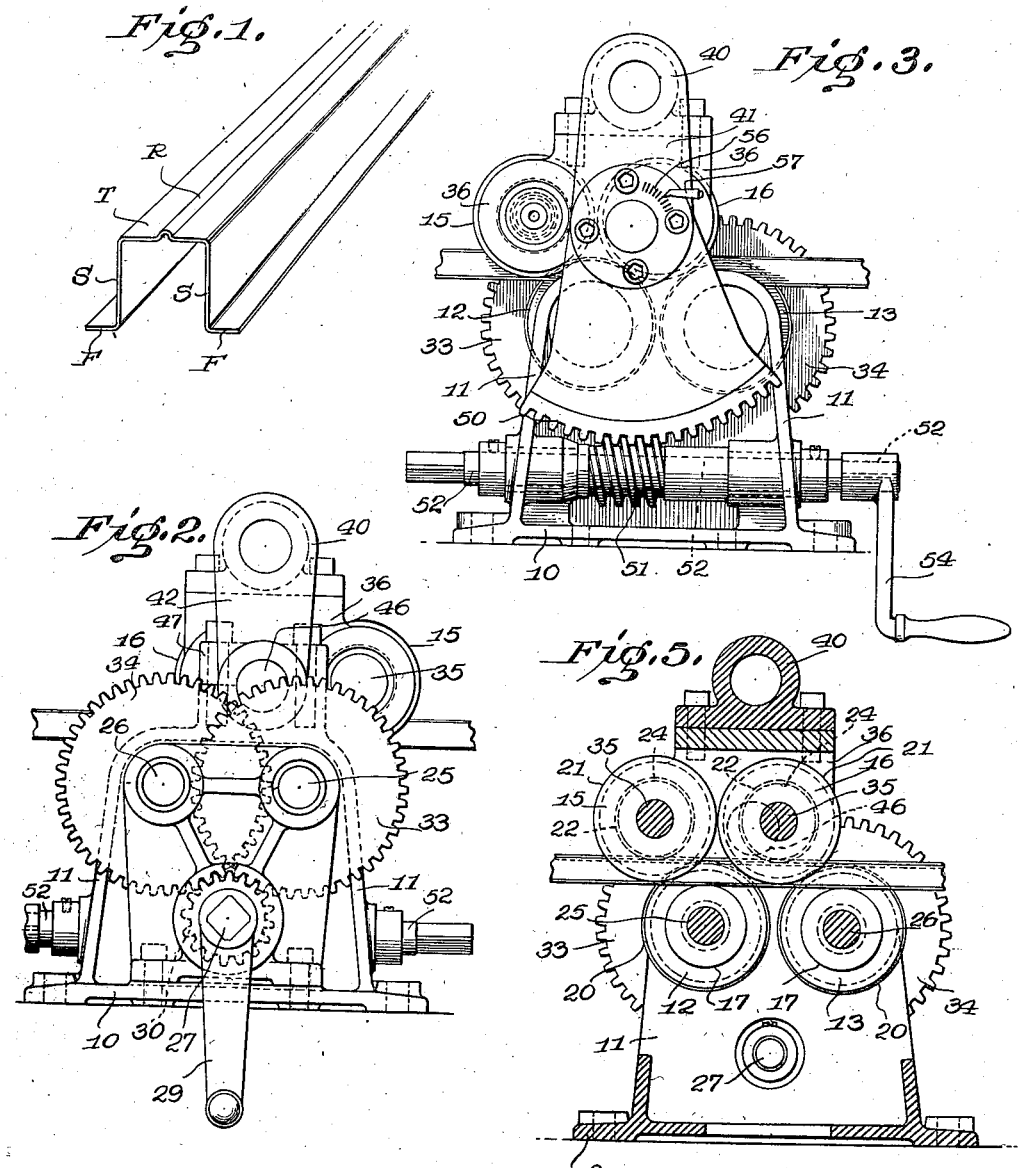

2,279,197

UNITED STATES PATENT OFFICE 2,279,197

FORMING MACHINE

George S. Hoell, Philadelphia, Pa., assignor to Edward G. Budd Manufacturing Co., Philadelphia, Pa., a corporation of Pennsylvania Application August 22, 1939, Serial No. 291,297

17 Claims. (Cl. 153—54)

The present invention relates to machines for bending metal strips and the like, and more particularly to a machine for forming curved strips adapted to be used in the construction of structural members for aircraft and the like, and to a method of curving the strips.

In the construction of aircraft wings or the like, it is customary to utilize a great number of curved cap strips or chords which serve as reinforcing members for securing a skin sheet or covering. These strips vary in curvature at different points to provide an aerofoil contour, and, for example, in a structure such as a wing, strips having as many as thirty or more different curvatures may be required. Since these strips are formed of stainless steel or other material of high tensile strength and are usually channel-shaped, hat-shaped or angular in cross-section, they are relatively stiff and cannot be accurately curved into shape manually. To use a separate machine for providing each different curvature is not feasible, because of cost involved in building so great a number of machines.

The present invention aims to provide a relatively simple, inexpensive compact machine, particularly adapted to form cap strips or stiffening chords having any desired curvature.

An object of the invention is to provide a machine adapted to curve angular or other sectioned strips lengthwise in either direction or to increase or decrease the curvature of an already curved strip.

Another object of the invention is to provide a machine for accurately curving angular sectioned strips or the like by first bending them lengthwise, first in one direction and then in the other direction to conform them to a template shape.

Another object is to provide a machine which is readily adjusted to form strips varying in curvature.

Another object is to provide a machine wherein the curvature of the strip passing through the machine can be progressively varied in predetermined increments.

Another object of the invention is to provide a machine wherein the means for determining the curvature and the means for moving the strips through the machine are operated by a common drive whereby a plurality of strips having a common identical curvature can be produced.

Another object of the invention is to provide a machine wherein readily interchangeable means may be utilized to control the curvature of the strip so that a plurality of strips of one shape or another shape may be readily produced.

A further object is to provide an improved method of forming cap strips having varying curvatures.

Other and further objects of the invention will be obvious upon an understanding of the illustrative embodiment about to be described, or will be indicated in the appended claims, and various advantages not referred to herein will occur to one skilled in the art upon employment of the invention in practice.

Generally described, a machine for carrying out the above objects and advantages may comprise a pair of rotatably mounted lower rollers and a pair of adjacent upper rollers cooperating with the lower rollers to receive the strips to be curved therebetween. The upper rollers are staggered with respect to the lower rollers so that one of the upper rollers has its axis intermediate the lower rollers and the other upper roller has its axis in advance of one of the lower rollers. The upper rollers are supported by a pivotally mounted member adapted to be turned about its pivot by suitable means and thus vary the relative position of the upper and lower pairs of rollers. With this arrangement in one position of adjustment, one of the upper rollers may cooperate with the lower rollers to curve the strips lengthwise in one direction, while in another position of adjustment the upper rollers may cooperate with one of the lower rollers to curve the strips in the other direction.

To enable the invention to be understood more clearly, a preferred embodiment of the invention has been chosen for purposes of illustration and description, and is shown in the drawings forming a part of the specification, wherein:

Fig. 1 is a fragmentary perspective view, illustrating a portion of a cap strip adapted to be curved and utilized for aircraft structures;

Fig. 2 is a front elevation view of a strip bending and shaping machine, illustrating a preferred embodiment of the invention;

Fig. 3 is a rear elevation view of the machine;

Fig. 4 is an end view of the machine, partly in section;

Fig. 5 is a sectional view taken along the line 5—5 on Fig. 4;

Figs. 6 and 7 are diagrammatic views, illustrating several positions of adjustment of the strip bending rollers; and the resulting curvature of the strip;

Fig. 8 is a rear elevational view of a modified machine, illustrating means for automatically varying the forming relation of the rollers; and Fig. 9 is a sectional view taken along the line 9—9 on Fig. 8.

Referring to the drawings, there is shown in Fig. 1, a metal strip which is adapted to be bent by the machine about to be described and which may be used, for example, as a curved rib member for aircraft structures. The strip illustrated herein has a hat-shaped cross section and is provided with a top portion T having a longitudinal stiffening bead or rib R therein, side flanges S depending downwardly from the top portion, and outwardly bent flanges F at the lower end of the side flanges for attachment purposes. The strips formed in this manner are relatively stiff and readily adapt themselves to aircraft structures.

Referring more particularly to Figs. 2 to 5 of the drawings, there is shown a strip bending machine which comprises a frame having a base 10, a pair of spaced upwardly extending standards or columns 11 on the base, a pair of lower bending rollers 12 and 13 and a pair of upper bending rollers 15 and 16 adjacent to and cooperating with the lower rollers in the manner described hereafter.

In order to receive the strip member having the shape illustrated in Fig. 1, the lower rollers are provided with cylindrical surfaces 17 for supporting outwardly extending flanges F and an intermediate cylindrical portion of greater diameter adapted to extend into the channel between the side flanges S and having a ribbed or beaded periphery 20 conforming substantially to the underside of the top portion T of the strip. The upper rollers are adapted to mate and cooperate with the lower rollers to support the strip against buckling during bending and, to accomplish this, are provided with a cylindrical surface 21 for engaging the outwardly extending flanges F of the strip and an intermediate cylindrical portion 22 of smaller diameter for engaging the top T and having a groove or recess 24 for receiving the rib R. The upper and lower rollers thus are adapted to receive the strip therebetween and apply bending pressure to the top and underside of the strip, stretching or shrinking the portions of the strip as the case may be.

The lower rollers 12 and 13 are respectively mounted on suitable shafts 25 and 26 journalled in the standards 11 and the bracket 11' bolted on the base plate 10 for rotation and, preferably, the shafts are rotated by a suitable drive which may comprise a drive shaft 27 adapted to be manually rotated by means of crank 29, and gears 30 and 31 on the drive shaft respectively meshing with a gear 33 on the roller shaft 25 and a gear 34 on the roller shaft 26. The lower rollers by being positively rotated are adapted to feed the strips through the machine.

The upper rollers may be mounted for rotation on idling shafts 35 rotatably disposed in a suitable bearing housing 36 adapted to position the upper rollers above the lower rollers in cooperative bending relation. The bearing housing is bridge supported by a trunnion bracket 40 or the like, having downwardly depending lever portions 41 and 42 provided with hubs 43 and 44 for respectively receiving trunnion shafts 45 and 46 mounted for rotation in suitable trunnion bearings 47 at the upper end of each of the standards 11 of the frame. As noted more particularly in Fig. 5, the upper rollers are arranged in the bearing housing so that the axes of the upper rollers are in staggered relation with respect to the axes of the lower rollers. For example, the upper roller 15 may be slightly in advance or to the left of the lower roller 12 and the upper roller 16 may be intermediate the lower rollers 12 and 13. By swinging or revolving the trunnion bracket 40 about its pivot provided by the shafts 45 and 46, the cooperative forming relation of the upper and lower rollers can be varied so that the upper rollers 15 and 16 in one position of adjustment may exert downward pressure on the strip in a direction towards the lower roller 12, (Fig. 7) and in another position of adjustment the upper roller 16 may exert downward pressure on the strip towards the lower rollers 12 and 13 (Fig. 6).

In order to vary the forming relation of the upper and lower rollers, the lever portion 41 has a worm wheel segment 50 bolted or otherwise secured to one side thereof and the segment is suitably supported for rotation by the trunnion shaft 45. The worm wheel segment may be rotated to effect swinging movement of the trunnion bracket about its pivot by a worm 51 meshing with the segment. This worm is mounted on a rotatable shaft 52 journalled in the frame and the shaft has a manually operable crank 54 at one end thereof for rotating the worm.

In order to readily ascertain the relative position of the upper rollers and the shape into which they will bend the strip, suitable indicating means may be associated with the frame of the bearing housing 36 or the trunnion bracket 40 for the upper rollers. Such means may comprise (Fig. 3) a scale 56 provided with suitable indicia thereon and secured to the bearing housing at one side thereof, and a stationary pointer 57 on the frame adjacent the scale.

In operation, when it is desired to curve a strip upwardly, the crank 54 is turned in a direction to operate the worm wheel segment and move the upper rollers clockwise from the position shown in Fig. 5, towards the position indicated in full lines in Fig. 6. When a strip is passed between the rollers, the upper roller 16 exerts bending pressure on the strip in the direction indicated by the arrow A, and lower rollers 12 and 13 bend the strip upwardly about the upper roller 16. As the strip passes through the three rollers, the curved or bent portion thereof may be directed upwardly toward the other upper roller 15 which then merely serves as a guiding roller and does not function to curve the strip. The roller 15 is idle and is not engaged by the strip in any forming relation. During the forming operation, the degree of curvature may be varied in small increments to give the strip a curvature of any desired gradually varying contour, and this may be done by manipulating the worm crank 54 to increase or decrease the magnitude and direction of the bending pressure exerted by the upper roller 16 as the strip passes thru the machine.

When it is desired to bend the strip downwardly, the upper rollers are swung in a counterclockwise direction from the position in which they are shown in Fig. 5, towards the position indicated in Fig. 7. The upper roller 15 is then effective to exert bending pressure on the strip in the direction indicated by the arrow B, and cooperates with the lower roller 12 to bend the strip downwardly while upper roller 16 serves to urge the strip downwardly in the direction indicated by the arrow C so that the upper rollers tend to progressively bend the strip about the lower roller 12. As the strip passes between the rollers, the curvature of the bend may likewise be varied by changing the direction and magnitude of the pressure applied by the three cooperating rollers. While these rollers are so positioned the fourth roller 13 is spaced from the upper roller 16 and does not engage the strip or affect the bending thereof.

If it is found that a strip which has been bent does not accurately conform to a template shape, it may be passed through the machine again and bending pressure may be increased or decreased in either upward or downward direction, as the strip may require, to give it its correct form. In this manner the strips can be precisely shaped to be within prescribed tolerances and meet the most exacting requirements which are usually demanded in the construction of aircraft parts.

In Figs. 8 and 9 a modified machine is shown wherein the variations of upward or downward bending pressure are automatically controlled during the passage of the strips between the upper and lower bending rollers. As illustrated herein, this may be accomplished by securing a lever 60 to the lever portion 41 of the trunnion bracket 40 and providing the lower end of the lever 60 with a cam roller 61 adapted to be engaged with a suitable cam 62 slidably mounted in the base of the machine. The cam has a suitable contour adapted to swing the lever 60 either clockwise or counterclockwise to effect the desired variations in magnitude and direction of the bending pressure applied to the strip. For example, the cam may have a portion 64 for first moving the rollers towards the position indicated in full lines in Fig. 6 to bend the strips upwardly and may have a succeeding dwell 65 for moving the lever 60 to swing the rollers towards the position shown in Fig. 5 to permit the remaining portion of the strips to pass through the rollers without being bent. Where a downward bend is desired the cam may be suitably shaped for moving the rollers towards the position indicated in broken lines in Fig. 7. It will be understood that any desirable curve may be formed in the strips by providing cams having predetermined contours adapted to provide such a curvature, and thus a set of ribs each of varying contour may be readily duplicated by interchanging cams.

The cam may be slidably mounted and keyed in a bracket 67 formed in the frame end 11 and may be interchangeably slid into place and suitable sliding clearance provided thru the adjustment 70. The cam has an integral sleeve 71 adapted to be moved in any suitable manner, and for this purpose may be provided with a screw threaded aperture 72 for receiving a worm or screw 73 which is part of the main drive shaft 27 or is attached thereto. In this manner, automatic changes in the cooperative forming relation of the rollers may be simultaneously effected while turning the crank 29 to rotate the lower rollers 12 and 13 which feed the strips through the machine.

From the foregoing description, it will be seen that the present invention provides an improved, simple, compact machine for forming curved strips wherein groups of three rollers may be selectively utilized. The machine is adapted to provide the strips with any desired curvature and the curvature can be progressively varied in small increments in either direction while the strips pass through the forming machine. The machine is readily adjusted to accurately maintain the shape of the strips within prescribed tolerances to conform to template shapes and can further be utilized to correct the shapes of strips improperly formed. When a cam is employed for varying the curvature, the shape of the strips is automatically controlled and variations from a desired shape will be reduced to a minimum. The cams eliminate the need of skilled labor and can be readily interchanged whenever a different shape is desired. The machine is rugged in construction and can readily withstand any rough usage to which it may be subjected.

While the machine has been described in connection with forming aircraft parts, it will be understood that it can also be utilized for forming curved parts of other constructions, for example, hulls of boats, tanks, buildings or other structures.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

I claim:

1. In a forming device of the class described the combination of a pair of rollers for engagement with one side of the work, a second pair of rollers adjacent said first pair of rollers for engagement with the other side of the work, a pivotally mounted bracket for supporting one pair of rollers, and means for turning said bracket about its pivot to selectively place one roller of one pair of rollers in cooperating work forming relation with the other pair of rollers.

2. In a device of the class described, the combination of a pair of lower rollers, a pair of upper rollers adjacent and staggered with respect to said lower rollers, and a pivotally mounted supporting member for mounting said upper rollers and means for turning said member about its pivot to revolve the axes of said upper rollers about the pivot and selectively place different groups of three rollers in different cooperative forming relation.

3. In a device of the class described, the combination of a pair of rollers for engagement with one side of the work, a second pair of rollers adjacent said first pair of rollers for engagement with the other side of the work, a pivotally mounted bracket for supporting said second pair of rollers, means for turning said bracket about its pivot to bodily move said second pair of rollers to vary the angular position thereof with respect to said first pair of rollers to vary the form of the work, and means for rotating one of said pairs of rollers.

4. In a device of the class described, the combination of a frame having a pair of spaced upwardly extending standards, a pair of rollers rotatably supported on said standards, a second pair of rollers adjacent said first pair of rollers, a bracket pivotally mounted on said standards and rotatably supporting said second pair of rollers, said bracket being adapted to be turned about its pivot to move said second pair of rollers with respect to said first pair of rollers.

5. In a device of the class described, the combination of a frame having a pair of spaced upwardly extending standards, a pair of lower rollers rotatably supported on said standards, a pair of upper rollers adjacent said pair of lower rollers, a bracket pivotally mounted at the upper end of said standards and having a downwardly depending housing for rotatably supporting said upper rollers, and means for turning said bracket about its pivot to move said second pair of rollers with respect to said first pair of rollers.

6. In a forming device of the class described, the combination of the frame having a pair of spaced upwardly extending standards, a pair of shafts rotatably mounted in said standards, a roller mounted for rotation on each of said shafts, means for rotating said shafts, a bracket pivotally mounted at the upper end of said standards, a pair of idling rollers mounted for rotation on said bracket and being adapted to cooperate with said lower rollers, and means for turning said bracket about its pivot to vary the forming relation of said upper rollers with respect to said lower rollers.

7. In a device of the class described, the combination of a pair of rollers, a roller adjacent said pair of rollers, a pivotally mounted bracket for supporting said roller, said bracket bridging the roller and being pivoted near the axis thereof, an arm having one end thereof connected to said bracket, and movable means engaging the other end of said arm to swing the arm and turn said bracket about its pivot whereby said bracket positions said roller with respect to said pair of rollers.

8. In a device of the class described, the combination of a pair of lower rollers, an upper roller adjacent said lower rollers, a pivotally mounted bracket for supporting said upper roller, a worm wheel secured to said bracket, a worm meshing with said worm wheel, and means for rotating said worm to rotate said worm wheel and turn said bracket about its pivot to position said upper roller with respect to said lower rollers.

9. In a forming device of the class described, the combination of a pair of lower rollers, an upper roller adjacent said lower rollers, a pivotally mounted bracket for supporting said upper roller, a driving means for said lower rollers, and means for turning said bracket about its pivot in timed relation with said driving means and in predetermined varying increments to position said upper rollers with respect to said lower rollers and vary the forming relation of said upper and lower rollers.

10. In a forming device of the class described, the combination of a pair of lower rollers, means for rotating said rollers, an upper roller adjacent said lower rollers, a pivotally mounted bracket for supporting said upper roller, and means for turning said bracket about its pivot in predetermined varying increments to position said upper roller with respect to said lower rollers, and drive means for roller rotating and bracket turning means.

11. In a device of the class described, the combination of a pair of lower rollers, an upper roller adjacent said lower rollers, the lower rollers being driven, a pivotally mounted bracket supporting said upper roller, and means including the drive to said lower rollers and a cam operated thereby for turning said bracket about its pivot to position said upper roller with respect to said lower rollers.

12. In a device of the class described, the combination of a pair of lower rollers, means for rotating said rollers, an upper roller adjacent said lower rollers, a pivotally mounted bracket supporting said upper roller, means including a cam for turning said bracket about its pivot to progressively vary the forming relation of said upper roller with respect to said lower rollers, and a common drive for said roller rotating and bracket turning means.

13. In a device of the class described, the combination of a pair of lower rollers, an upper roller adjacent said lower rollers, a pivotally mounted bracket for supporting said upper roller, and means for turning said bracket about its pivot to position said upper roller with respect to said lower rollers, said means including an interchangeable cam having a surface of predetermined curvature adapted to effect turning of the bracket in predetermined varying increments.

14. In a device of the class described, the combination of the frame having a base and a pair of spaced upwardly extending standards, a pair of lower rollers rotatably mounted on said standards, a bracket pivotally mounted at the upper end of said standards, a pair of upper rollers carried by said bracket, a downwardly depending arm having its upper end secured to said bracket, and having a roller at its lower end, a slidable cam engaging said roller, means for moving said cam with respect to said roller to move said arm and turn said bracket about its pivot, and means for simultaneously rotating one pair of said rollers and operating said cam moving means.

15. In a device of the class described, the combination of opposed pairs of rollers for engagement as pairs with the opposite sides of the work, one of said opposed pairs of rollers being bodily movably mounted to move together as a pair to shift the plane of their axes with respect to the plane of the axes of the other pair, and means for so moving them.

16. In a device of the class described, the combination of opposed pairs of rollers for engagement as pairs with the opposite sides of the work, one pair being staggered with respect to the other in the direction of travel of the work between them, one of said opposed pairs of rollers being bodily movably mounted to move together as a pair to shift the plane of their axes with respect to the plane of the axes of the other pair, and means for so moving said pair whereby different groups of three rollers may be brought into different cooperative forming relation.

17. In a device of the class described, the combination of opposed pairs of rollers, one of said opposed pair of rollers being bodily movably mounted to move together as a pair to shift the plane of their axes with respect to the plane of the axes of the other pair, means for so shifting them, means for driving one pair of rollers, said driving and shifting means being operatively interconnected, so that the shifting takes place in timed relation to the driving.

GEORGE S. HOELL.